United States Patent [19]

Planeta

[11] Patent Number: 4,676,728
[45] Date of Patent: Jun. 30, 1987

[54] APPARATUS FOR GAUGE DISTRIBUTION IN PLASTIC TUBING

[76] Inventor: Mirek Planeta, 228 McCraney Street West, Oakville, Ontario, Canada, L6H 1H7

[21] Appl. No.: 883,198

[22] Filed: Jul. 8, 1986

[51] Int. Cl.$^4$ ............................................. B29C 53/20
[52] U.S. Cl. ............................. 425/387.1; 264/209.2; 264/563; 264/566; 425/72 R; 425/326.1; 425/327
[58] Field of Search ...................... 425/72 R, 135, 140, 425/141, 326.1, 327, 388, 387.1; 264/40.1, 40.3, 209.2, 564, 566, 569, 563

[56] References Cited

U.S. PATENT DOCUMENTS

| | | | |
|---|---|---|---|
| 2,844,846 | 7/1958 | Kronholm | 425/72 R |
| 3,492,693 | 2/1970 | Clarke et al. | 264/209.2 |
| 3,576,935 | 4/1971 | Dyer et al. | 264/563 |
| 3,657,974 | 4/1972 | Hedrich et al. | 425/327 X |
| 3,716,322 | 2/1973 | Kratzert | 425/327 X |
| 3,768,949 | 10/1973 | Upmeier | 425/392 |

FOREIGN PATENT DOCUMENTS

| | | | |
|---|---|---|---|
| 927560 | 6/1973 | Canada. | |
| 988265 | 5/1976 | Canada. | |
| 1900614 | 8/1970 | Fed. Rep. of Germany | 425/327 |
| 1030187 | 5/1966 | United Kingdom | 264/566 |

Primary Examiner—Richard L. Chiesa
Attorney, Agent, or Firm—Rogers & Scott

[57] ABSTRACT

The apparatus of the invention provides gauge distribution in extruded plastic tubing, so that a more uniform roll thereof is obtained. The extruded plastic tube, usually blown to increase its diameter and decrease its wall thickness, is collapsed and passed through a diametrical slot in a rotor, which is rotated about a vertical axis so that any non-uniformity in wall thickness of the tube is distributed as much as possible around its periphery. The upwardly-moving tube passes over a skew member which turns it to move horizontally. Two spaced parallel end rollers are provided between one end of the slot and the rotor periphery, and each engages the tube during a respective 180° of rotation to deliver the tube to a fixed roller on the apparatus frame from where it passes to the storage roll. Two deflection rollers are also provided on opposite sides of the slot, and each engages the tube in the rotation of the rotor close to zero and 360° to hold the tube away from the slot and ensure that it does not foul the portion of the tube emerging from the slot. A dancer roll may be provided to maintain constant tension. The tube engaging members may be rollers or hollow bars with air issuing apertures in the surfaces over which the tube passes to form a corresponding air cushion between the tube and the member surface.

5 Claims, 11 Drawing Figures

APPARATUS FOR GAUGE DISTRIBUTION IN PLASTIC TUBING

FIELD OF THE INVENTION

The present invention is concerned with an improved apparatus for effecting gauge distribution in extruded plastic tubing.

REVIEW OF THE PRIOR ART

Thin plastic film and thin wall plastic tubing is now almost universally produced by extruding a tube of the plastics material from an annular die, expanding the tube before it has cooled by introducing pressurized air to the tube interior, and subsequently when it has cooled sufficiently flattening the tube and winding it on a mandrel into a storage roll. It is found almost always that the tube has some irregularities in its wall thickness, owing for example to irregularities in the annular gap of the extrusion die, and, since it is almost impossible to remove these irregularities, it is common to move them circumferentially of the tube to avoid a local cumulative build-up in radius of the roll along its length. This movement is accomplished in some apparatus by slow rotation of the die, and in others by slow rotation of the wind-up apparatus between the die and the storage roll. The rotation of the die has been accomplished through a full 360° of rotation but results in a relatively complex and expensive installation. One prior proposal known to me for rotation of the wind-up apparatus is able to accomplish only 180° of rotation, so that the irregularities still are not fully distributed, and is that described in U.S. Pat. No. 3,576,935, issued Apr. 27th, 1978 to DuPont, in which the flattened plastic tube passes vertically upwards through a slot in a rotatable carrier over a skew bar disposed at 45° so that the tube now moves horizontally; it then passes over a vertical roller at one end of the slot and subsequently passes back over the slot to a vertical take-off roller disposed at the centre of the slot, both of the last-mentioned rollers being mounted on the rotor, from whence the tube passes to a stationary structure at the side of the rotor feeding the tube to the storage roll.

DEFINITION OF THE INVENTION

It is therefore the principal object of the present invention to provide a new apparatus for effecting gauge distribution in extruded plastic tubing by rotating the wind-up apparatus between the die and the storage roll, the apparatus of the invention providing for such rotation through a full 360°.

In accordance with the present invention there is provided apparatus for effecting gauge distribution in extruded plastic tubing comprising:

an apparatus frame;

a rotor mounted by the frame for sequential, reversed rotation through 360° about a vertical axis and having a diametrical slot therein;

motor means for rotating the rotor;

a tube collapsing frame mounted on the rotor for rotation therewith with its exit below the said slot, the collapsing frame receiving the tube, collapsing it and delivering the collapsed tube to the slot to pass upwards therethrough;

a skew member mounted on the rotor above the slot and inclined at 45° to the vertical, the skew member receiving the collapsed tube and changing its direction of movement from vertical upwards to horizontal;

a frame tube engaging member mounted by the apparatus frame receiving the flattened tube from the rotor and directing it to a storage roll;

a first vertical end tube engaging member mounted on the rotor between one end of the slot and the rotor periphery and receiving the tube from the skew member and directing it to the said frame tube engaging member during substantially one 180° rotation of the rotor;

a second vertical end tube engaging member mounted on the rotor between the said one end of the slot and the rotor periphery, close to and parallel to the first vertical end tube engaging member, and receiving the tube from the skew member and directing it to the said frame tube engaging member during substantially the other 180° rotation of the rotor; and first and second vertical deflection tube engaging members mounted on the rotor on opposite sides of the slot and spaced therefrom, each deflection member engaging the tube in a respective 180° rotation of the rotor to space it from the slot and thereby prevent fouling of the tube with the portion of the tube issuing from the slot.

DESCRIPTION OF THE DRAWINGS

Particular preferred embodiments of the invention will now be described, by way of example, with reference to the accompaning diagrammatic drawings, wherein.

DESCRIPTION OF THE PREFERRED EMBODIMENTS

Figure 1:
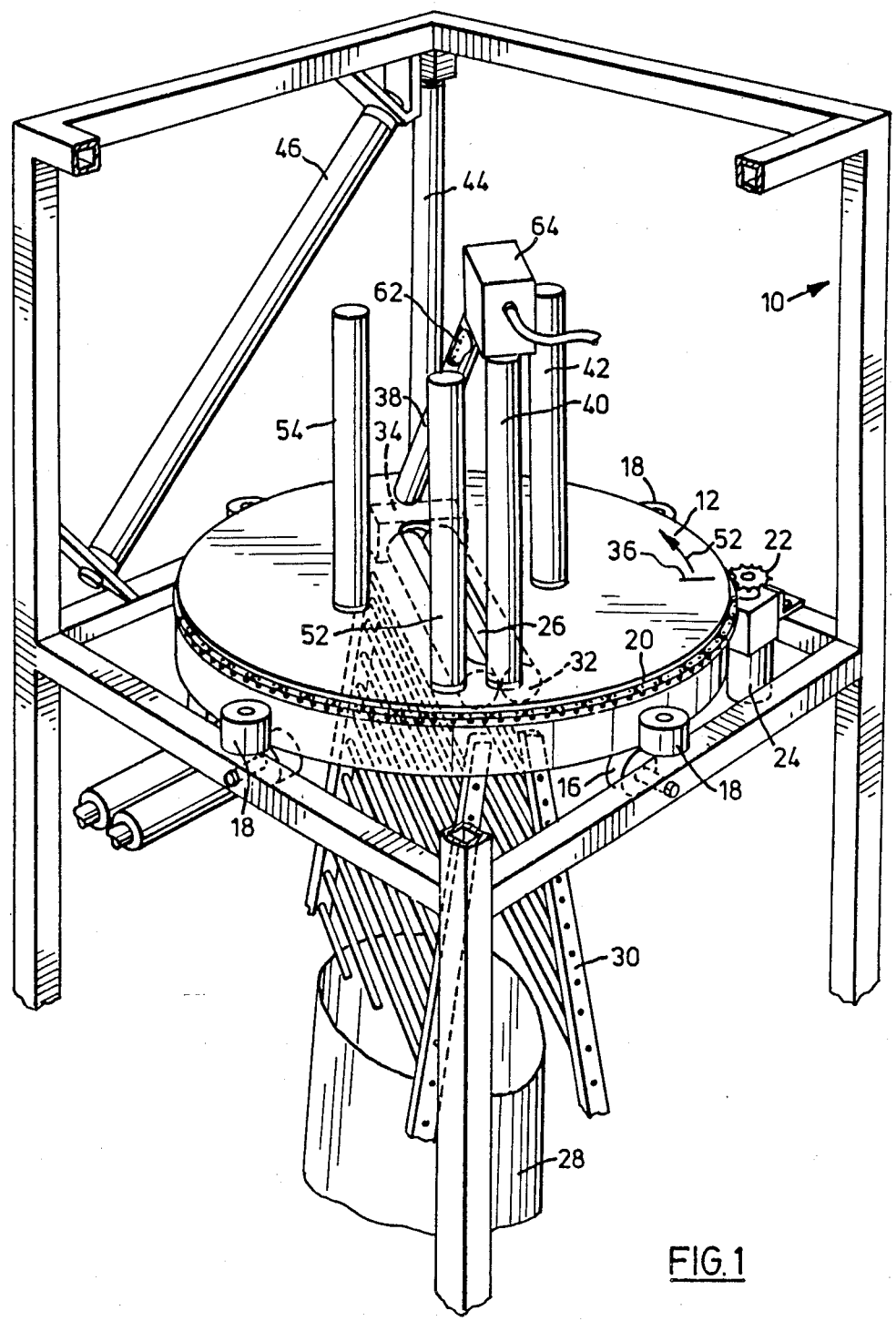
FIG. 1 is a perspective view of the apparatus without a plastic tube, and with part of the support framework shown broken away, for clarity of illustration.

The apparatus of the invention consists of a support framework 10 in which a circular rotor 12 is mounted for rotation about a vertical axis 14 by means of horizontal guide rollers 16 and vertical guide rollers 18. An endless drive chain 20 is mounted around the periphery of the rotor and is engaged by a drive sprocket 22 driven by a motor 24. An electric or hydraulic circuit required for driving the motor 24 to rotate the rotor through 360° sequentially in opposite directions is not illustrated, but will be apparent to those skilled in the particular art of small motor control. The rotor is provided with a central diametrically-extending slot 26 through which vertically upwardly-moving flattened tube 28 of plastic material passes so as to extend equally radially from the axis 14. As is now conventional in this art the tube of plastic material in molten state issues from an annular extrusion die (not shown) and is expanded to form a larger-diameter bubble by the introduction of pressurized air to its interior. The material is cooled by means of one or more air rings (not shown) surrounding the tube close to the die that direct cooling air on to its exterior. When the tube is sufficiently cooled it is collapsed and flattened by a collapsing frame 30, which in this embodiment is mounted on the underside of the rotor 12 and rotates with it. The frame delivers the collapsed tube to a pair of nip rolls 32 that are driven by a motor 34, the frame 30 and the rolls 32 delivering the vertically-moving tube through the slot 26.

Figure 2:
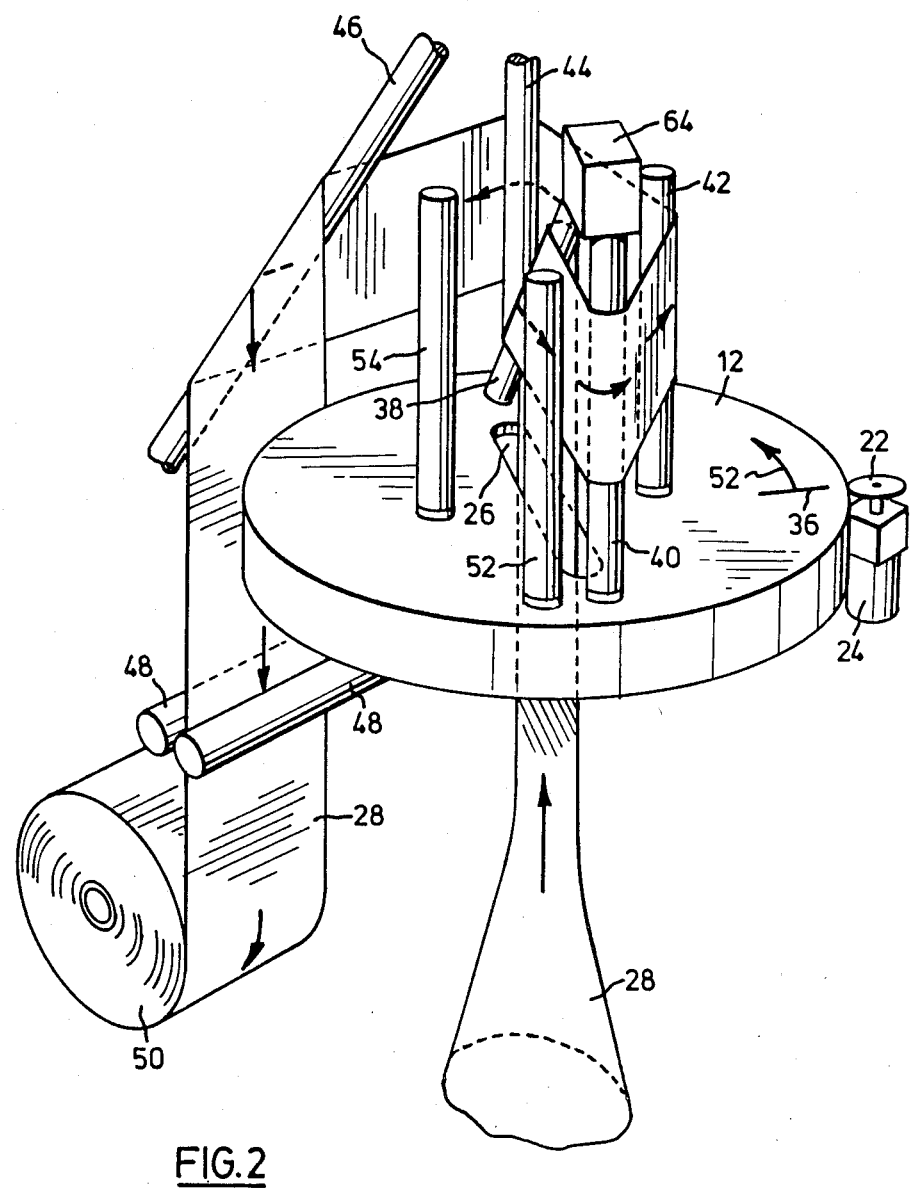
FIG. 2 is a view with the same perspective as FIG. 1 showing a tube passing through the apparatus, and with only certain of the tube engaging elements shown, again for clarity of illustration, the apparatus being in what may be regarded as the 0° position for the rotor.
Figure 7A:
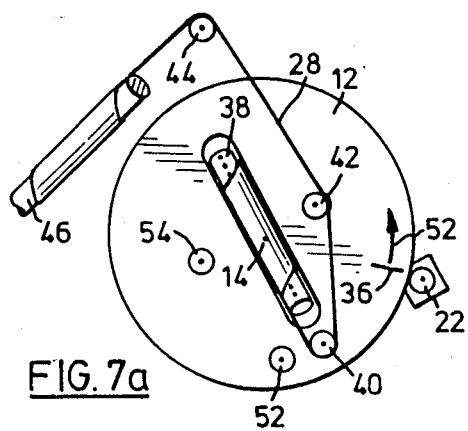
FIGS. 7a through 7e are progressive plan views to show the manner in which the flattened tube is transferred between the different rolls of the rotor as it rotates through 360°.

Reference is now made particularly to FIGS. 2 and 7a, which show the rotor in what for convenience is designated as its 0° rotation position, the rotor being shown with a radial index mark 36 adjacent the drive sprocket 22 for subsequent reference purposes. The upwardly moving tube 28, having passed through the slot 26, is led over a skew bar 38 which extends over the slot at an angle of 45° to the vertical, the bar changing the direction of movement of the tube from vertical to horizontal. The horizontally-moving tube then passes in sequence around a vertical end-of-slot roller 40 mounted on the rotor between the end of the slot and the periphery of the rotor, a first vertical deflection roller 42, mounted to one side of the slot approximately adjacent its center, and also carried by the rotor, a fixed vertical frame roller 44 mounted by the frame 10, and a fixed skew frame roller 46, also mounted by the frame 10. The skew roller 46 is inclined at 45° to the vertical and directs the flattened tube for vertical movement down through a pair of nip rolls 48 and thence to a wind-up roll 50.

Figure 7B:
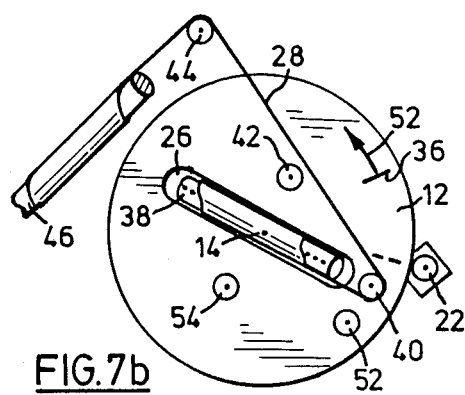

As the rotor rotates in the direction of the arrow 52 the tube stays in contact with all of the skew bar 38 and rolls 40 through 46 until it reaches the position shown in FIG. 7b, when the tube leaves the first deflection roller 42 and continues in contact only with the bar 38 and rollers 40, 44 and 46. At this point in this embodiment the rotor has rotated through an angle (FIG. 7b) of about 40°. The original position of the index mark 36 is shown in broken lines and the angle in question is between the original position and the current position of the mark. It will be seen that during this initial rotation from the start position the deflecting roller 42 has held the tube away from the skew bar 38 and the portion of the upwardly moving tube coming from the slot 26 on to the bar; now that this new position has been reached this function is no longer required.

Figures 3, 4:
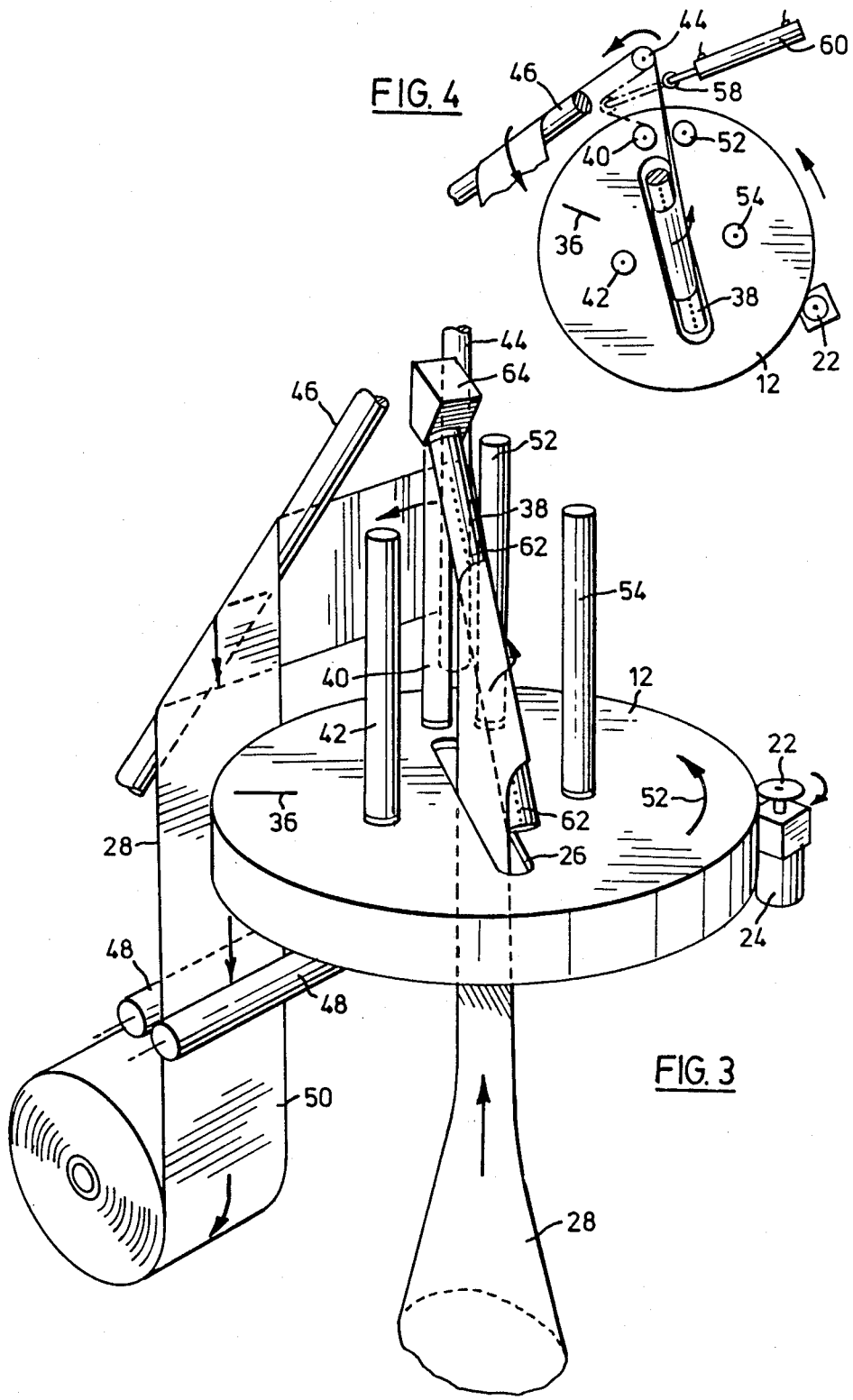
FIG. 3 is a view similar to FIG. 2 and showing the tube and apparatus in what may be regarded as the 180° position for the rotor.
FIG. 4 is a plan view corresponding to the 180° position of FIG. 3 and illustrating an alternative embodiment.
Figure 5:
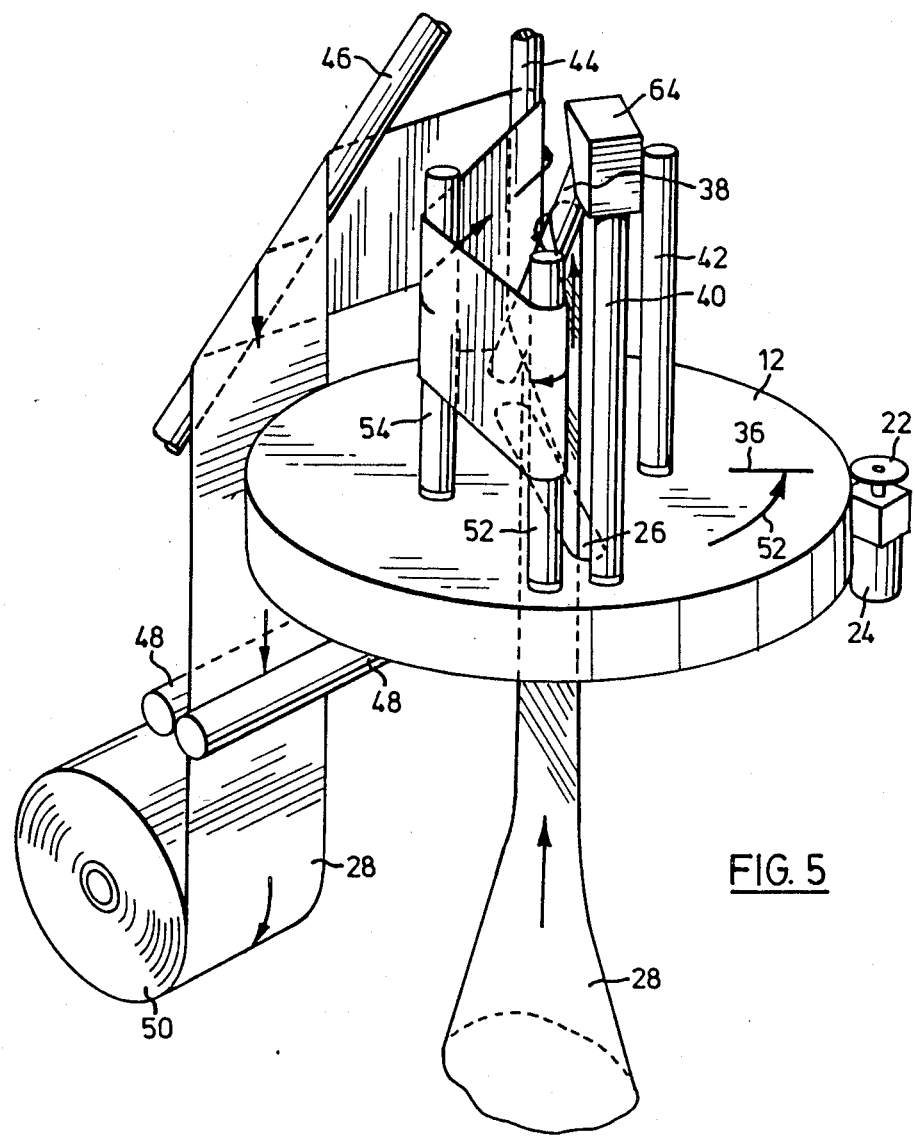
FIG. 5 is a view corresponding to FIGS. 2 and 3 and showing the tube and apparatus with the rotor in its 360° position.
Figure 7C:
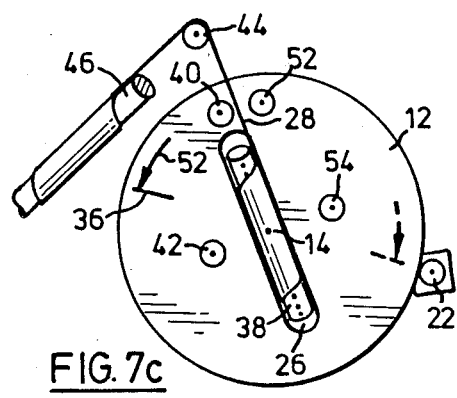
Figure 7D:
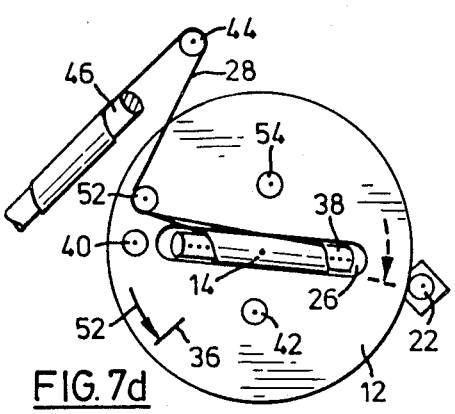
Figure 7E:
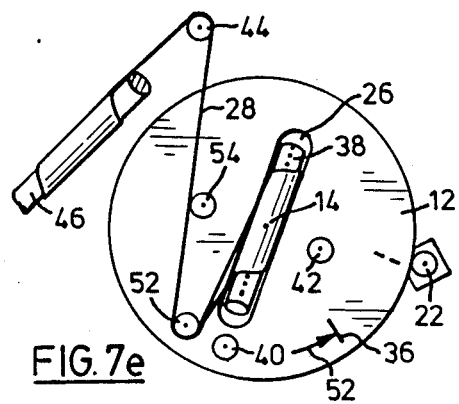

This configuration remains as the rotor continues to rotate until the stage is reached that is illustrated by FIGS. 3 and 7c, the rotor having rotated through about 180°; the tube now passes directly from the skew bar 38 between end roller 40 and a second closely-spaced, parallel vertical end roller 52 onto the fixed frame roller 44 and thence to the skew roller 46. Further rotation of the rotor engages the tube with the second end roller 52, in place of the first end roller 40, as illustrated by FIG. 7d, and this latter configuration continues until the situation illustrated by FIG. 7e is reached, where the tube has encountered a second deflection roller 54 disposed diametrically opposite to the first deflection roller 42. The rotor is now able to continue its rotation to the 360° position illustrated by FIG. 5 with the assurance that the tube will not foul the portion of the tube passing up out of the slot and over the skew bar 38. Upon reaching this position the motor 24 is reversed automatically and the rotor rotated back to the position illustrated by FIG. 7a, when the cycle repeats.

Figure 6:
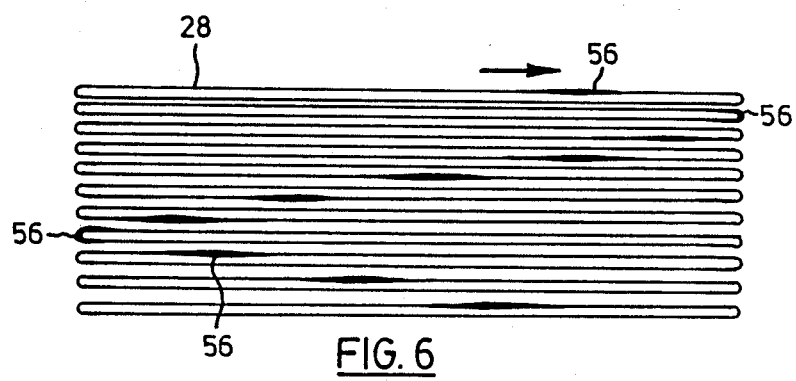
FIG. 6 is an illustration of the application of the invention to distribute a thickened portion of the tube wall uniformly over the width of the roll of tube, the figure being a partial diametrical cross-section through the roll.

The effect of the apparatus of the invention on a roll 50 of tube is illustrated by FIG. 6, which shows diagrammatically and not to scale a radial cross section through part of the roll, comprising a plurality of layers of the flattened tube piled one on top of the other. It is assumed that a local thickening 56 is present in the tube wall and eleven layers of tube are formed at this roll radius for a single 360° rotation of the rotor. Since the rotor is able to rotate a full 360° the thickening 56 is distributed uniformly across the width of the roll in the successive layers, so that maximum uniformity of roll diameter is obtained.

There may be the possibility of some minor tightening and slackening of the flattened tube as it is handed from roll to roll (e.g. between the two rollers 40 and 52), and as it is engaged by and disengaged from the two deflection rollers 42 and 54, and if assurance is required that this will not happen it is possible to provide a dancer roll 58 (FIG. 4) which is gently permanently urged into contact with the tube by a pneumatic or hydraulic motor 60 and maintains the tube under a correspondingly uniform tension.

In this embodiment a fixed skew bar 38 is provided, although a roller can be employed instead. To ensure that the tube passes smoothly over the bar it is hollow and is provided along its length, at the upper side over which the tube passes, with a line of small air orifices 62 through which air is forced under pressure to provide an air cushion between the tube and the bar. The head 64 in which the bar is mounted forms an air plenum which is provided with pressurized air from a source (not shown) via a hose 66. The head is supported by a shaft (not shown) passing through the roller 42.

In this embodiment both of the two deflecting rollers 42 and 54 are disposed equidistantly from the slot 26 and approximately mid-way along its length, and these are the preferred locations. However, their locations can be varied widely from these specific positions, and they need not be symmetrically disposed relative to one another, as long as their locations are such that they are able to provide their deflecting function and prevent fouling of the tube during the rotation of the rotor close to its 0° and 360° positions.

Although in this embodiment the skew member 38 is a solid bar and the subsequent tube-engaging members are all rollers mounted for rotation about their respective longitudinal axes, instead the member 38 can be a roller, preferably hollow and provided with air issuing apertures over its entire surface, and instead any of the other members can be a fixed bar, preferably also hollow and provided with a plurality of air-issuing apertures in the portion of the surface that is engaged by the tube.

It will be seen therefore that I have provided a simple robust structure which permits full 360° rotation of the rotor without the possibility of fouling between the tube as it passes from the rotor to the fixed roller 44 and the portion of the tube that issues from the slot 26 and passes over the skew member 38.

I claim:

1. Apparatus for effecting gauge distribution in extruded plastic tubing comprising:

an apparatus frame;

a rotor mounted by the frame for sequential, reversed rotation through 360° about a vertical axis and having a diametrical slot therein;

motor means for rotating the rotor;

a tube collapsing frame mounted on the rotor for rotation therewith with its exit below the said slot, the collapsing frame receiving the tube, collapsing it and delivering the collapsed tube to the slot to pass upwards therethrough;

a skew member mounted on the rotor above the slot and inclined at 45° to the vertical, the skew member receiving the collapsed tube and changing its direction of movement from vertical upwards to horizontal;

a frame tube engaging member mounted by the apparatus frame receiving the flattened tube from the rotor and directing it to a storage roll;

a first vertical end tube engaging member mounted on the rotor between one end of the slot and the rotor periphery and receiving the tube from the skew member and directing it to the said frame tube engaging member during substantially one 180° rotation of the rotor;

a second vertical end tube engaging member mounted on the rotor between the said one end of the slot and the rotor periphery, close to and parallel to the first vertical end tube engaging member, and receiving the tube from the skew member and directing it to the said frame tube engaging member during substantially the other 180° rotation of the rotor; and first and second vertical deflection tube engaging members mounted on the rotor on opposite sides of the slot and spaced therefrom, each deflection member engaging the tube in a respective 180° rotation of the rotor to space it from the slot and thereby prevent fouling of the tube with the portion of the tube issuing from the slot.

2. Apparatus as claimed in claim 1, wherein the said vertical end tube engaging members and the said vertical deflection tube engaging members are rollers mounted for rotation about respective vertical axes.

3. Apparatus as claimed in claim 2, wherein the said skew member is a hollow skew bar having a plurality of air issuing apertures in the portion of the surface thereof that is engaged by the flattened tube, and there is provided means providing air under pressure to the interior of the bar, the issuing air forming a cushion of air between the surface of the bar and the corresponding surface of the tube.

4. Apparatus as claimed in claim 1, wherein the said skew member is a hollow skew bar having a plurality of air issuing apertures in the portion of the surface thereof that is engaged by the flattened tube, and there is provided means providing air under pressure to the interior of the bar, the issuing air forming a cushion of air between the surface of the bar and the corresponding surface of the tube.

5. Apparatus as claimed in claim 1, and including a dancer roll for engagement with the tube, disposed ahead of the frame tube engaging member, and motor means for urging the dancer roll into engagement with the tube to maintain constant tension therein.

* * * * *